US005654692A

United States Patent [19]

Baxter, Jr. et al.

[11] Patent Number: 5,654,692
[45] Date of Patent: Aug. 5, 1997

[54] TRACKING BUOY

[76] Inventors: John F. Baxter, Jr., 930 Heron Ct., Marco Island, Fla. 33937; David F. Bailey, 9921 Kenda Dr., Riverview, Fla. 33569

[21] Appl. No.: 653,019

[22] Filed: May 24, 1996

[51] Int. Cl.[6] ................................ G08B 1/08; H04Q 7/00

[52] U.S. Cl. .......................... 340/539; 340/623; 340/601; 340/603; 340/693; 340/605; 73/61.51

[58] Field of Search ..................................... 340/539, 623, 340/601, 603, 693, 605; 367/13; 73/61.51

[56] References Cited

U.S. PATENT DOCUMENTS

| | | | |
|---|---|---|---|
| 4,644,328 | 2/1987 | Szymansky et al. | 340/539 |
| 5,481,904 | 1/1996 | Fleck, Sr. et al. | 73/61.51 |
| 5,532,679 | 7/1996 | Baxter, Jr. | 340/539 |

*Primary Examiner*—Jeffery Hofsass
*Assistant Examiner*—Sihong Huang
*Attorney, Agent, or Firm*—A. W. Fisher, III

[57] ABSTRACT

A tracking buoy including a sensor to detect the presence of hydrocarbons in a body of water and a communication system to transmit data to a remote monitoring center when the hydrocarbons are detected to indicate the direction and speed of travel of the hydrocarbons in the body of water.

21 Claims, 6 Drawing Sheets

TRACKING BUOY

BACKGROUND OF THE INVENTION

1. Field of the Invention

A tracking buoy to detect the presence of an oil spill and indicate the direction and speed of the oil slick resulting from the oil spill.

2. Description of the Prior Art

Oil spills, large and small, are among today's most environmentally damaging events. Even relatively small spills that normally go undetected can wreck havoc with the ecosystem. Early detection is vital in containing and cleaning up oil spills before such spills reach populated areas, protected coastal environments and inland waterways.

U.S. Pat. No. 3,719,936 discloses a system for the detection of oil spillage in water including a housing adapted to be disposed in a partially submerged buoyant state in a body of water and having a plurality of ports to allow entry of water and oil that is present on the surface thereof. A selectively transmissive permeable membrane of the hydrophobic hypophylic type is disposed within the housing in liquid communication with the oil-water interface. Only oil is transmitted through the permeable membrane to a chamber within the housing having a sensor disposed therein to detect the presence of oil and to generate an output signal of the oil when detected. The sensor comprises a resistance temperature dependent electrical thermometer or mechanically actuable by the weight of oil within the chamber to generate the output signal. The chamber can be removed from the detection system to permit collection of oil samples for analysis to determine the nature and source of the contaminant. In addition, a plurality of chambers can be provided to permit the sequential collection of a corresponding plurality of oil samples over time. A marking material can also be released to visually mark the spill site.

U.S. Pat. No. 4,058,802 describes a device for detecting the presence of contaminants, such as an oil spill, in a body of water. At a predetermined location in the body of water at least one detector station means is provided having at least one contaminant detector element. The contaminant detector element has a characteristic that changes for the condition of the presence of a contaminant impinging thereon. The characteristic may be a dimension thereof. Sensing means are provided to detect changes in the characteristic and to generate an information signal responsive to such changes in the information signal response to such changes in the characteristic. A transmitter means is provided for transmitting a transmission signal response to the information signal when there has been a change in the characteristic. The transmission signal is transmitted to regions remote the detector station means. At such regions remote from the detector station means there is provided a receiving station means which receives the transmission signal and provides an output signal such as a control signal or a visual or audible signal in response thereto.

U.S. Pat. No. 3,918,034 shows a detector unit and system for detecting and signaling the presence of an oil slick on the body of water. An oil sensing assembly consists of a hydrophobic, oleophilic oil sensing material secured to one end of a rod and a magnet secured to the opposite end of the rod, the rod extending into the central bore of a watertight ballasted shell which houses a battery powered transmitter. An adjustable magnetic reed switch is positioned in the housing for actuation by the magnet secured to the rod to initiate an output signal from the transmitter. A wire cage surrounds the oil sensing material. An antenna connected to the output of the transmitter extends upwardly from the wire cage. Arms having floats on their terminating ends extend laterally outwardly from the shell, the floats having sufficient flotation capacity to suspend the unit in the water. The oil sensing assembly incorporating the hydrophobic oil sensing material is sufficiently buoyant to float on the surface of the water. When the oil sensing material contacts oil floating on the surface of the water, the assembly sinks into the water, moving the target adjacent the reed switch to close it and initiate an output signal from the transmitter which is received by a corresponding receiver. The receiver activates an audio or visual alarm.

U.S. Pat. No. 3,719,936 teaches a system for the detection of oil spillage on water including a housing adapted to be disposed in a partially submerged buoyant state in a body of water and having a selectively transmissive member for transmission of oil to a chamber which includes a sensor for detecting the presence of oil therein and for providing an output indication of oil presence.

U.S. Pat. No. 3,603,952 describes sensing methods and apparatus for monitoring the surface condition of a body of water including floating sensor units deployed on the water surface employing reflected infrared radiation detectors to sense the presence of floating hydrocarbons from an oil spill or floating industrial waste, sewage or the like. Telemetry signals report the surface condition of the body of water to a central receiver unit.

SUMMARY OF THE INVENTION

The present invention relates to a tracking buoy to indicate the direction and speed of travel of an oil slick created by an oil spill.

The tracking buoy comprises a lower housing and an upper cover to operatively support an antenna, a tracking sensor means and a tracking buoy mounting means to operatively house a power source, a tracking buoy control and a tracking buoy transmitter. The tracking buoy further includes a tracking buoy retainer/release mechanism operatively mounted to a platform by an attachment member to selectively mount and release the tracking buoy to and from the platform.

The lower housing comprises a substantially hemispherical member including a sensor recess formed in the side wall thereof to operatively house the tracking sensor means; while, the upper cover comprises a flattened substantially convex cap such that the flattened substantially hemispherical member and the substantially convex cap cooperatively form a chamber to house the power source, the tracking buoy control and the tracking buoy transmitter therein.

The tracking buoy mounting mechanism comprises a first mounting member affixed to the upper cover and a second mounting member disposed within a housing attached to the platform to selectively receive the upper portion of the first mounting member therein. The first mounting member comprises an elongated vertically disposed element and a switch means operable in a first and second state. The second mounting member comprises an upper mounting body having a centrally disposed mounting recess formed in the lower portion thereof to selectively receive and house the upper portion of the elongated vertically disposed element, a retainer/release mechanism chamber formed on opposite sides thereof to operatively receive and house a portion of the tracking buoy retainer/release mechanism as described more fully hereinafter and a tracking buoy switch control means disposed adjacent the centrally disposed mounting recess to control the operation of the switch means as described more fully hereinafter.

The tracking buoy retainer/release mechanism comprises a pair of retainer/release devices disposed within the housing to operatively engage a portion of the tracking buoy mounting means to selectively retain and release the tracking buoy as described more fully hereinafter. Each retainer/release device comprises an actuator member movable between a first or retention position and a second or release position normally held in the first or retention position by a position means or bias. The inner portion of each actuator member extends through the corresponding retainer/release mechanism chamber to engage the upper portion of the elongated vertically disposed element within the centrally disposed mounting recess such that the switch means is disposed adjacent the tracking buoy switch control means to maintain the switch means in the first state of position.

The tracking sensor means comprises at least one tracking sensor comprising a state of the art fluorometer including an automatic temperature composition means capable of detecting and measuring hydrocarbons, petroleum and petroleum by-products in the parts-per-billion range when present in the water adjacent the tracking buoy.

An oil spill detection system may comprise a stationary platform anchored in the water for use with a remote control center and the tracking buoy to be deployed when an oil slick is detected.

The stationary platform includes a sensing means to generate a detection signal when hydrocarbons are sensed to release the tracking buoy including a radar reflector or a transmitter/receiver combination and a communication system to generate a data signal including date, time and site location for transmission to the remote control center when the hydrocarbons are sensed.

Thus when hydrocarbons are detected by the sensing means, the communication system transmits the data signal including the time, date and site location to the remote control center and the tracking buoy is released into the oil slick. When the first mounting member is operatively disposed within the second mounting member, the tracking buoy switch control means maintains the switch means in the first state to deactivate or deenergize the tracking buoy. When released, the switch means moves away from the tracking buoy switch control means causing the switch means to move to the second state activating or energizing the tracking buoy.

Once deployed, the current will carry the tracking buoy along with the oil slick. The position of the tracking buoy relative to the remote control center can be determined from the radar reflector or the transmitter. As the tracking buoy moves freely along with the oil slick created by the oil spill the location of the tracking buoy relative to the stationary platform is monitored with respect to time by the remote control center to permit calculation of the direction and speed of travel of the oil slick.

The particular configuration of the tracking buoy allows the tracking buoy to track the leading edge of an oil slick. The substantially hemispherical member provides optimal current transport; while, the flattened substantially convex cap provides optimal wind driven slick surface transport. A balance is provided between above surface wind and the subsurface current propulsion. Thus the modified spheroid provides the best dynamics for tracking surface slicks in all water conditions.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to a tracking buoy to indicate the direction and speed of travel of an oil slick created by an oil spill.

As described hereinafter, the tracking buoy may be used with an oil spill detection system to detect the presence of oil in harbors, bays, gulfs, canals, rivers, environmentally sensitive coastal waters, recreational beach areas, heavily traveled shipping lanes, lakes and waters to indicate the direction and speed of travel of the oil slick created by the oil spill. As discussed more fully hereinafter, the tracking buoy is configured to be automatically deployed from a stationary or tethered buoy or a stationary platform. Alternately, the tracking buoy can be deployed from an aircraft, ship or other vehicle.

Figure 1:
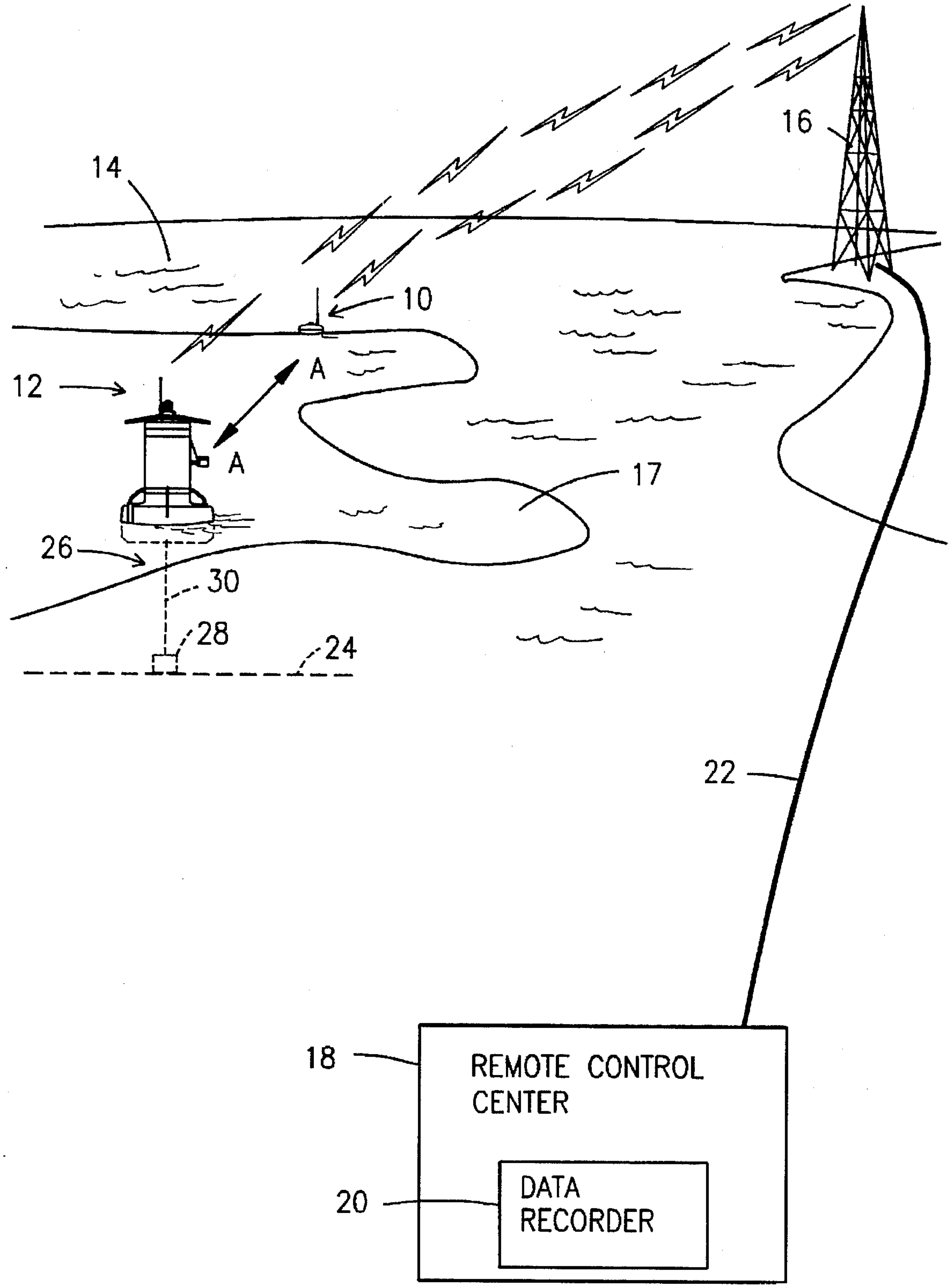
FIG. 1 shows the tracking buoy of the present invention deployed in a body of water.

As best shown in FIG. 1, an oil spill detection system comprising the tracking buoy generally indicated as 10 may be used with a stationary buoyant detection platform generally indicated as 12 deployed in the body of water 14 to be monitored for use with a remote monitoring system comprising a communication tower 16 and a remote control center generally indicated as 18 including a data recorder 20 operatively coupled by a communication cable or link 22. Alternately, the data recorder 20 may be located externally of the remote control center 18 to receive data directly from the communication tower 16 or the stationary buoyant detection platform 12. When deployed, the stationary buoyant detection platform 12 is tethered or anchored to the bottom 24 of the body of water 14 by an anchor system generally indicated as 26 including an anchor 28 and flexible interconnecting member 30.

Figure 2:
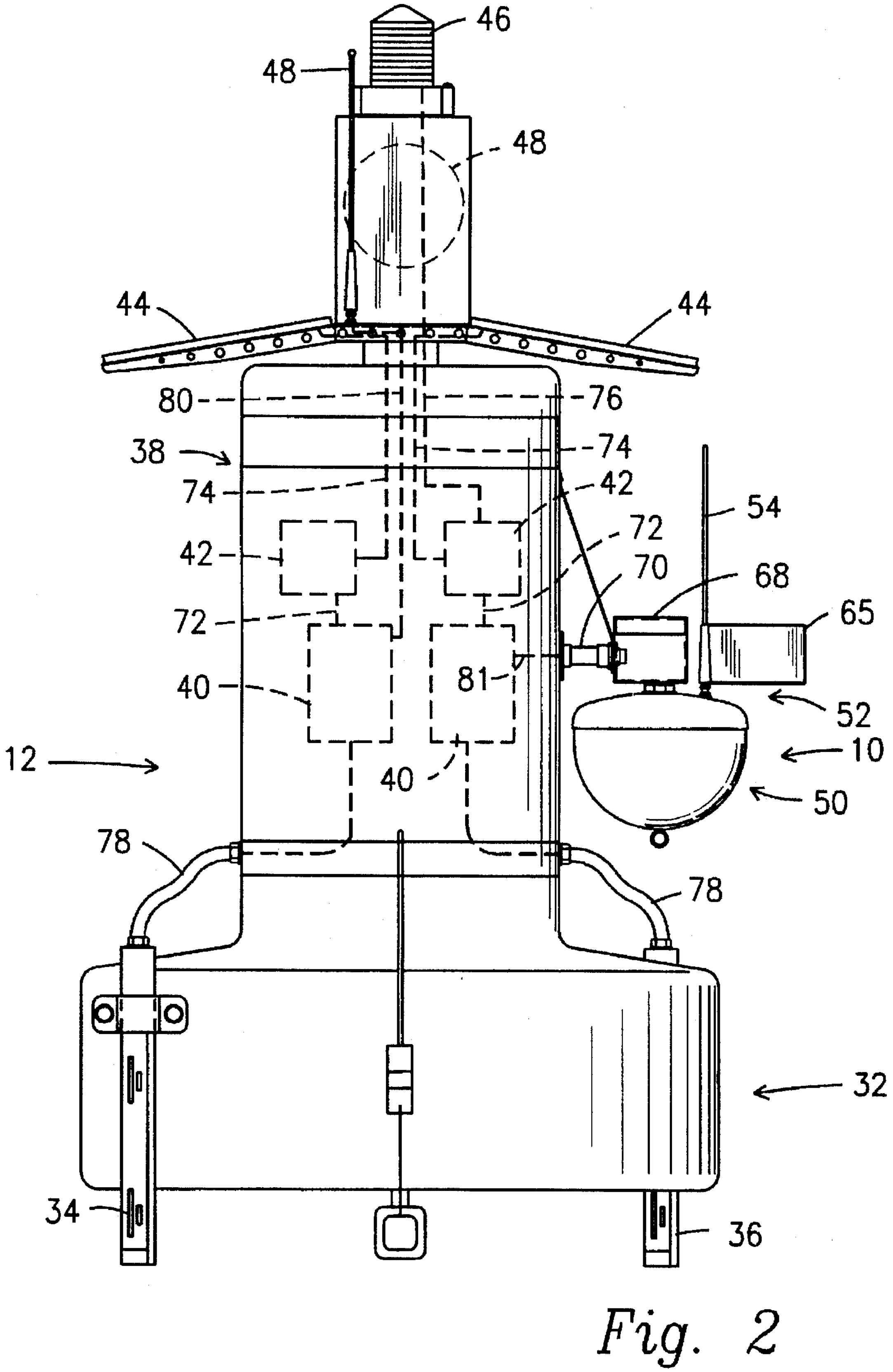
FIG. 2 shows a front view of the tracking buoy of the present invention mounted on a stationary buoyant detection platform.

As best shown in FIG. 2, the stationary buoyant detection platform 12 comprises a lower floatation chamber generally indicated as 32 having a sensing means including a first detection sensor 34 and second detection sensor 36 attached thereto and a housing generally indicated as 38 to operatively house a communication means including one or more communication modules 40 and a power source such as one or more storage batteries each indicated as 42. A plurality of solar cells each indicated as 44, a marine lantern or beacon 46 and a communication antenna 48 are mounted on the upper portion of the housing 38.

The first and second detection sensors 34 and 36 each comprises a state of the art fluorometer including an automatic temperature composition means capable of detecting and measuring hydrocarbons petroleum and petroleum by-products in the parts-per-billion range when present in the water 14 adjacent the stationary buoyant detection platform 12. The first and second detection sensors 34 and 36 include means to generate a detection signal when the hydrocarbons are sensed.

The communication system includes means to receive the detection signals from the first and second detection sensors 34 and 36 and to generate a data signal in response thereto for transmission to the remote monitoring or control site as described more fully hereinafter. The communication system may also include a receiver for two-way communication.

As best shown in FIGS. 2 through 5, the tracking buoy 10 comprises a lower housing generally indicated as 50 and an upper cover generally indicated as 52 to operatively support an antenna 54, a tracking sensor means generally indicated as 56 and a tracking buoy mounting means generally indicated as 58 and to operatively house a power source such as a storage battery 60, a tracking buoy control 62 and a tracking buoy transmitter 64. Of course, a transmitter/receiver combination may be included to provide communication between the tracking buoy 10 and a remote site. In addition, a radar reflector 65 may be mounted on the tracking buoy.

Figure 3:
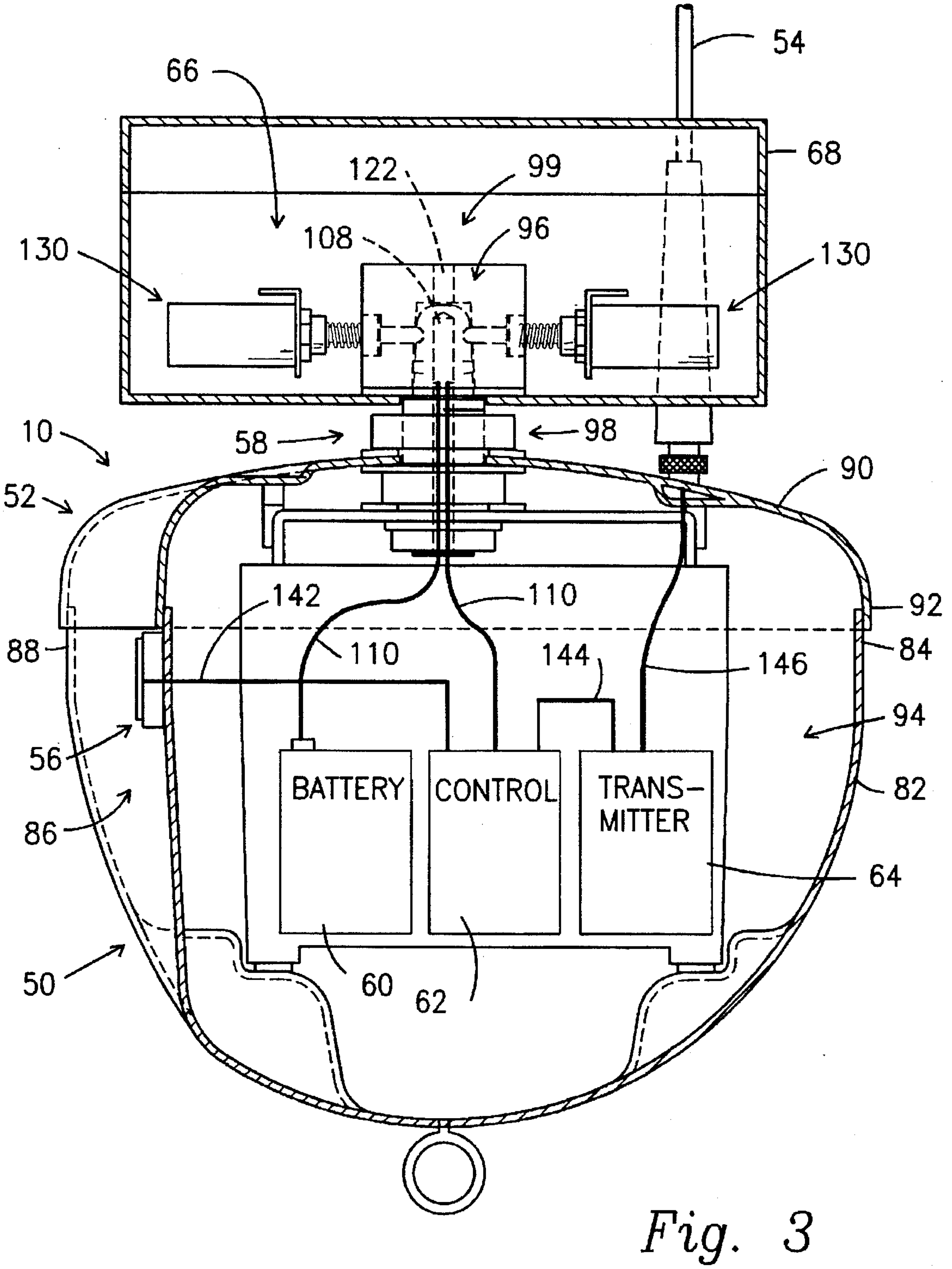
FIG. 3 is a detailed cross-sectional front view of the tracking buoy of the present invention.

As best shown in FIGS. 2 and 3, the tracking buoy 10 further includes a tracking buoy retainer/release mechanism generally indicated as 66 operatively disposed within a housing 68 and mounted to the housing 38 by an attachment member 70 to selectively mount and release the tracking buoy 10 to and from the stationary tracking buoy 12.

As shown in FIG. 2, the storage batteries 42 are coupled to the communication modules 40 by conductors 72, to the solar cells 44 by conductors 74 and to the marine lantern or beacon 46 by conductor 76. The communication system or communication modules 40 are coupled to the first and second detection sensors 34 and 36 by cables 78 and to the communication antenna 48 by a conductor or cable 80. At least one of the communication modules 40 is coupled to the tracking buoy 10 by a conductor or cable 81.

Figure 4:
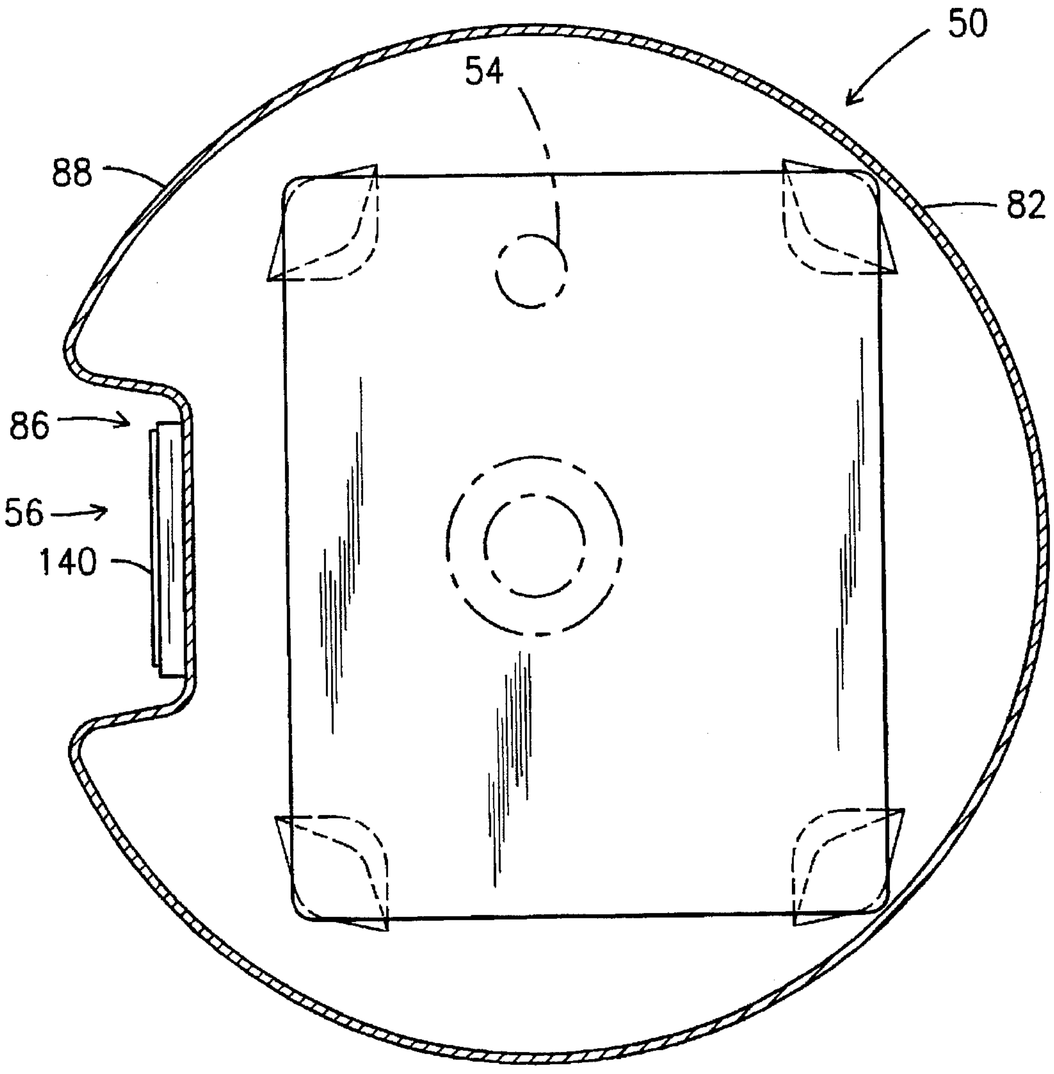
FIG. 4 is a cross-sectional view of the tracking buoy of the present invention.
Figure 5:
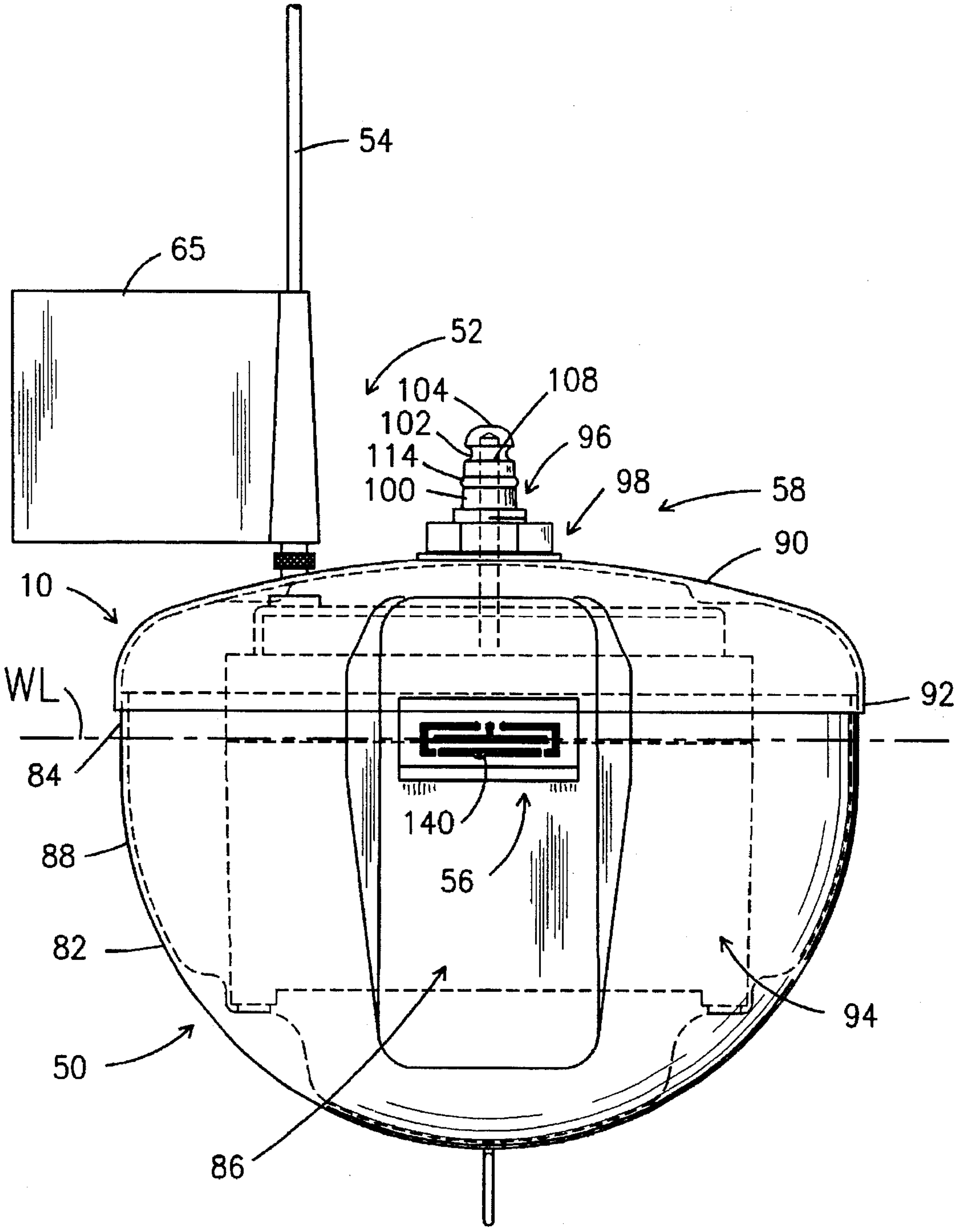
FIG. 5 is a side view of the tracking buoy of the present invention.

As best shown in FIGS. 3 through 5, the lower housing 50 comprises a substantially hemispherical member 82 including a substantially cylindrical flat upper periphery 84 and a sensor receptacle comprising a sensor recess 86 formed in the side wall 88 of the substantially hemispherical hollow member 82 to operatively house the tracking sensor means 56 therein. As best shown in FIGS. 3 and 5, the upper cover 52 comprises a flattened substantially convex cap 90 including a substantially cylindrical flat lower periphery 92 configured and sized to engaged the outer surface of the substantially cylindrical flat upper periphery 84 such that the flattened substantially hemispherical member 82 and the substantially convex cap 90 cooperatively form a chamber 94 to house the power source 60, the tracking buoy control 62 and the tracking buoy transmitter 64 therein.

Figure 6:
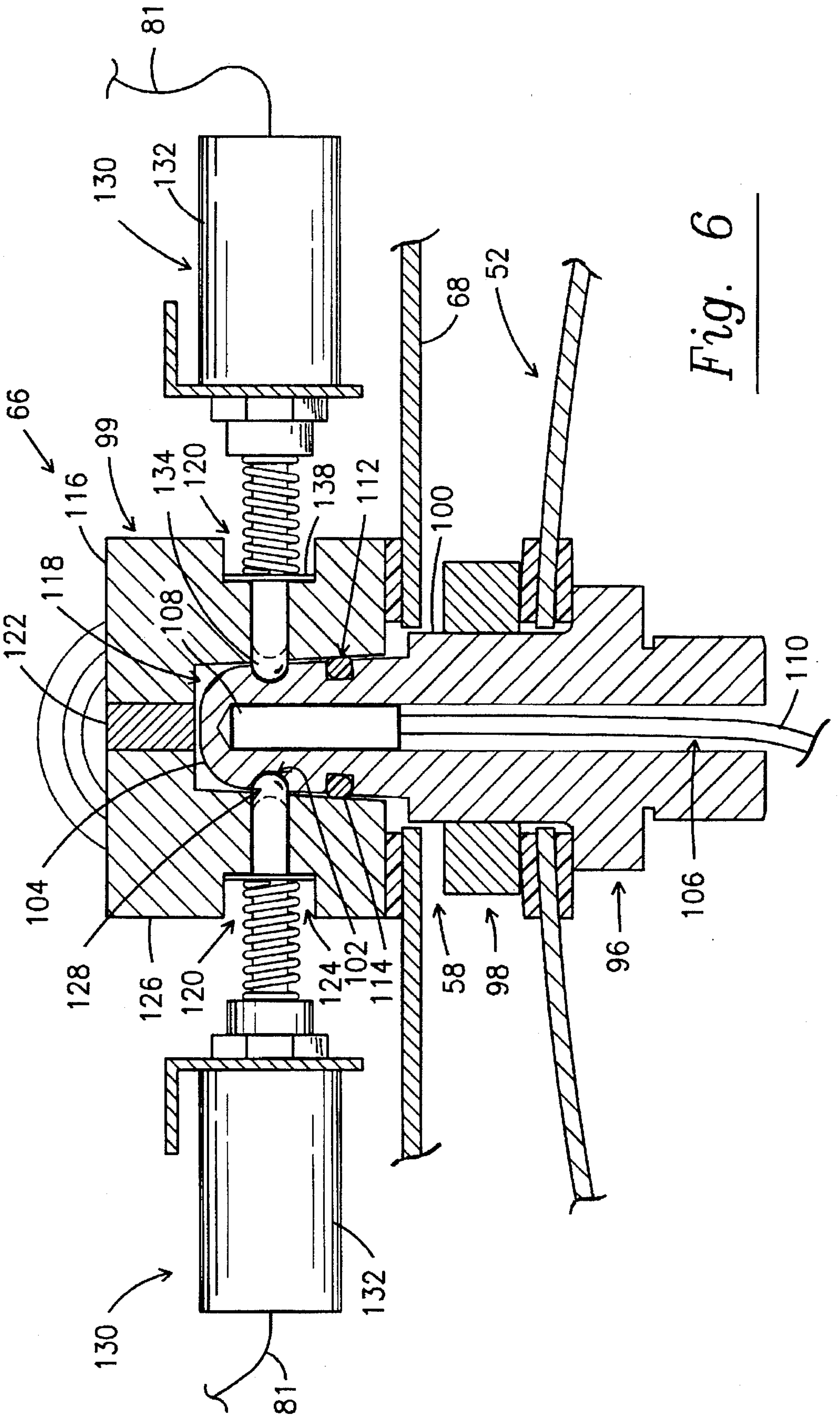
FIG. 6 is a partial detailed cross-sectional view of the tracking buoy retainer/release mechanism and the tracking buoy mounting mechanism of the present invention.

As best shown in FIGS. 3, 5 and 6, the tracking buoy mounting mechanism 58 comprises a first mounting member generally indicated as 96 affixed to the upper cover 52 by a fastening means generally indicated as 98 and a second mounting member generally indicated as 99 disposed within the housing 68 to selectively receive the upper portion of the first mounting member 96 therein. The first mounting member 96 comprises an elongated vertically disposed element 100 including a first retainer means comprising a concave annular recess or groove 102, a convex upper end portion 104 and a channel 106 to house a switch means 108 operable in a first and second state such as a reed switch and a conductor 110 therein. In addition, a second concave annular recess or groove 112 is formed in the periphery of the elongated vertically disposed element 100 to receive an O-ring or seal 114 therein. The second mounting member 99 comprises an upper mounting body 116 having a centrally disposed mounting recess 118 formed in the lower portion thereof to selectively receive and house the upper potion of the elongated vertically disposed element 100, a retainer/release mechanism chamber generally indicated as 120 formed on opposite sides thereof to operatively receive and house a portion of the tracking buoy retainer/release mechanism 66 as described more fully hereinafter and a tracking buoy switch control means such as a magnet 122 disposed adjacent the centrally disposed mounting recess 118 to control the operation of the switch means 108 as described more fully hereinafter. The retainer/release mechanism chamber 120 comprises an outer recess 124 formed in the outer wall or surface 126 of the upper mounting body 116 and an inner channel 128 extending between the outer recess 124 and the centrally disposed mounting recess 118.

As best shown in FIG. 3 and 6, the tracking buoy retainer/release mechanism 66 comprises a pair of retainer/release devices each indicated as 130 disposed within the housing 68 to operatively engage a portion of the tracking buoy mounting means 58 to selectively retain and release the tracking buoy 10 as described more fully hereinafter. Each retainer/release devices 130 comprises a solenoid 132 coupled to at least one of the communication modules 40 by the conductor 81 including an actuator member 134 movable between a first or retention position and a second or release position normally held in the first or retention position by a position means or bias 136 disposed between the solenoid and a position element 138 disposed within the outer recess 124. As shown, the inner portion of each actuator member 134 extends through the corresponding inner channel 128 to engage the surface of the concave annular recess or groove 102 to retain the upper portion of the elongated vertically disposed element 100 within the centrally disposed mounting recess 118 such that the switch means 108 is disposed adjacent the magnet 122 to maintain the switch means 108 in the first state or position.

As best shown in FIGS. 4 and 5, the tracking sensor means 56 comprises at least one tracking sensor 140 comprising a state of the art fluorometer including an automatic temperature composition means capable of detecting and measuring hydrocarbons, petroleum and petroleum by-products in the parts-per-billion range when present in the water 14 adjacent the tracking buoy 10. The tracking sensors 140 also includes means to generate a detection signal when the hydrocarbons are sensed.

As shown in FIG. 3, the control 62 is coupled to the battery 60 through the switch means 108 by the conductor 110, the first and second tracking sensors 140 by a conductor 142 and to the transmitter 64 by a conductor 144 which, in time, is coupled to the antenna 54 through cable or conductor 146.

The communication system can best be understood by reference to FIG. 5 of copending application Ser. No. 08/391,424 filed Feb. 16, 1995. Specifically, the communication system or communication module shown as 42 in the copending application, comprises a first and second latch or switch indicated as 92 and 94 respectively operatively coupled to the first and second detection sensors 36 and 38 respectively by the corresponding cable 76. The first latch or switch 92 including a time delay device and the second latch or switch 94 are operatively coupled to a control means 96 such as a latch or switch including circuitry to generate a control signal by conductors 98 and 100 respectively, when the detection sensors 36 and 38 detect the presence of hydrocarbon, a first detection signal is generated and transmitted to the communication system and held for a predetermined time period such as ten seconds until the second detection sensor 36 or 38 also detects the presence of the hydrocarbons and generates a second detection signal which is also transmitted to the communication system. The control means 96 then generates an enable signal in response to the two detection signals. The output of the control means 96 is operatively coupled to the tracking buoy retainer device 80 and an encoder/decoder/memory means 102 by a conductor 104 to transmit the control signal thereto. The encoder/decoder/memory means 102 includes circuitry to generate a data signal in response to the control signal transmitted to a transmitter/receiver means 106 through conductor 108 that is, in turn, fed to the communication antenna 54 through conductor 110 for transmission to the remote monitoring system to warn of an oil spill. The encoder/decoder memory means 102 also includes a memory medium to record operation of the communication system or communication module 42. Further, the transmitter/receiver 106 as shown in the copending application, permits polling or interrogation of the operation and status of the oil spill detection system from a remote site.

As previously described herein, the oil spill detection system comprises a stationary buoyant detection platform 12 anchored in the water 14 for use with a remote control center 18 with the floating tracking buoy 10 to be deployed when an oil slick 17 is detected.

The stationary buoyant detection platform 12 includes a sensing means to generate a detection signal when hydrocarbons are sensed to release the tracking buoy 10 including a radar reflector 65 or a transmitter/receiver combination and a communication system to generate a data signal including date, time and site location for transmission to the remote control center 18 when the hydrocarbons are sensed.

Thus when hydrocarbons are detected by the sensing means, the communication system transmits the data signal including the time, date and site location to the remote control center 18 and the tracking buoy 10 is released into the oil slick 17. When the first mounting member 96 is operatively, disposed within the second mounting member 99 as best shown in FIG. 6, the tracking buoy switch control means 122 maintains the switch means 108 in the first state to deactivate the tracking buoy 10. When released, the switch means 108 moves away from the tracking buoy switch control means 122 causing the switch means 108 to move to the second state activating the tracking buoy 10.

Once deployed, the current will carry the tracking buoy 10 along with the oil slick 17. The position of the tracking buoy 10 relative to the remote control center 18 can be determined from the radar reflector 65 or the transmitter 64. As the tracking buoy 10 moves freely along with the oil slick 17 created by the oil spill the location of the tracking buoy 10 relative to the stationary buoyant detection platform 12 is monitored with respect to time by the remote control center 18 to permit calculation of the direction and speed of travel of the oil slick 17 as shown in FIG. 1. In particular, at any given time the remote control center 18 can calculate the speed of travel of the tracking buoy 10 and therefore the speed of travel of the oil slick 17 by dividing the distance traveled for the elapsed time. The remote control center 18 is capable of determining the position of the stationary buoyant detection platform 12 relative to the tracking buoy 10 to indicate the direction of travel of the tracking buoy 10 and therefore the direction of travel of the oil slick 17 for the corresponding elapsed time. As is evident, the data acquisition and calculations are elementary requiring the most basic technology which Applicant has properly chosen to depict in block form.

The particular configuration of the tracking buoy 10 allows the tracking buoy 10 to track the leading edge of a oil slick 17. The substantially hemispherical member 82 provides optimal current transport; while, the flattened substantially convex cap 90 provides optimal wind driven slick surface transport. The tracking buoy 10 is ballasted to ride low in the water such that the waterline WL is located below the substantially cylindrical flat lower periphery 92. Thus, a balance is provided between above surface wind and the subsurface current propulsion. Thus the modified spheroid provides the best dynamics for tracking surface slicks in all water conditions.

The sensor recess 86 allows water to flow freely to sensor area; while, maintaining protection from mechanical damage.

Although the sensing means in intended for use to detect hydrocarbons, alternate sensors may be employed to detect other contaminates. The oil spill detection can also be effectively used with existing floating bell buoys and light buoys; rigid navigational aids; peninsulas or islands; offshore platforms; jetties and breakwaters; docks and piers; canal locks and rivers.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A tracking buoy for deployment in a body of water to monitor and indicate the direction and speed of travel of contaminants in the body of water, said tracking buoy comprises a lower housing and an upper cover, said lower housing comprises a substantially hemispherical member and said upper cover comprises a flattened substantially convex cap such that said substantially hemispherical member and said flattened substantially convex cap cooperatively form a chamber and a tracking buoy mounting mechanism comprising a first mounting member including an upper portion affixed to said upper cover and a second mounting member disposed to selectively receive said upper portion of said first mounting member therein and a tracking buoy retainer/release mechanism operatively disposed to selectively retain and release said tracking buoy therefrom, said first mounting member comprises an elongated vertically disposed element including a first retainer means and said tracking buoy retainer/release mechanism comprises at least one retainer/release device disposed to selectively engage said first retainer means to selectively retain and release said tracking buoy.

2. The tracking buoy of claim 1 wherein said lower housing and upper cover operatively support an antenna and a tracking sensor means and operatively house a power source, a tracking buoy control and a tracking buoy transmitter to provide communication between said tracking buoy and a remote site.

3. The tracking buoy of claim 1 wherein said lower housing further includes a substantially cylindrical flat upper periphery and said upper cover includes a substantially cylindrical flat lower periphery configured and sized to engaged the outer surface of the substantially cylindrical flat upper periphery.

4. The tracking buoy of claim 1 wherein said second mounting member comprises an upper mounting body having a centrally disposed mounting recess formed in the lower portion thereof to selectively receive and house said upper portion of said elongated vertically disposed element and a retainer/release mechanism chamber to operatively receive and house a portion of said tracking buoy retainer/release mechanism.

5. The tracking buoy of claim 4 wherein said retainer means comprises an annular groove.

6. The tracking buoy of claim 5 wherein said tracking buoy retainer/release mechanism comprises a pair of said retainer/release devices.

7. The tracking buoy of claim 6 wherein each said retainer/release device comprises an actuator member movable between a retention position and release position normally disposed in said retention position to engage said annular groove to retain said upper portion of said elongated vertically disposed element within said centrally disposed mounting recess.

8. The tracking buoy of claim 4 wherein said first mounting member includes a switch means operable in a first and second state to energize said tracking buoy when in said second state, and said tracking buoy retainer/release mechanism includes a tracking buoy switch control means disposed adjacent said centrally disposed mounting recess to control the operation of said switch means such that said switch means is disposed adjacent said tracking buoy switch control means to maintain said switch means in said first state.

9. The tracking buoy of claim 5 wherein said retainer/release device comprises an actuator member movable between a retention position and release position normally disposed in said retention position to engage said annular groove to retain said upper portion of said elongated vertically disposed element within said centrally disposed mounting recess.

10. A tracking buoy including a sensor to detect the presence of contaminants in a body of water to indicate the direction and speed of travel of the contaminants in the body of water, said tracking buoy comprising a lower housing having a sensor recess formed in the side wall thereof to house said sensor therein and an upper cover, said tracking buoy further including a tracking buoy mounting mechanism comprising a first mounting member includes an upper portion affixed to said upper cover and a second mounting member disposed to selectively receive said upper portion of said first mounting member therein and a tracking buoy retainer/release mechanism operatively disposed to selectively retain and release said tracking buoy therefrom, said first mounting member comprises an elongated vertically disposed element having an upper portion and including an annular retainer groove and said tracking buoy retainer/release mechanism comprises at least one retainer/release device disposed to selectively engage said annular retainer groove to selectively retain and release said tracking buoy.

11. The tracking buoy of claim 10 wherein said lower housing and said upper cover operatively support an antenna and operatively house a power source, a tracking buoy control and a tracking buoy transmitter to provide communication between said tracking buoy and a remote site when the contaminants are detected.

12. The tracking buoy of claim 11 wherein said lower housing comprises a substantially hemispherical member and said upper cover comprises a flattened substantially convex cap such that said substantially hemispherical member and said flattened substantially convex cap cooperatively form a chamber.

13. The tracking buoy of claim 12 wherein said lower housing further includes a substantially cylindrical flat upper periphery and said upper cover includes a substantially cylindrical flat lower periphery configured and sized to engaged the outer surface of the substantially cylindrical flat upper periphery.

14. The tracking buoy of claim 10 wherein said second mounting member comprises an upper mounting body having a centrally disposed mounting recess formed in the lower portion thereof to selectively receive and house said upper portion of said elongated vertically disposed element and a retainer/release mechanism chamber to operatively receive and house a portion of said tracking buoy retainer/release mechanism.

15. The tracking buoy of claim 14 wherein said retainer/release device comprises an actuator member movable between a retention position and release position normally disposed in said retention position to engage said annular groove to retain said upper portion of said elongated vertically disposed element within said centrally disposed mounting recess.

16. The tracking buoy of claim 14 wherein said first mounting member includes a switch means operable in a first and second state to energize said tracking buoy when in said second state, and said tracking buoy retainer/release mechanism further includes a tracking buoy switch control means disposed adjacent said centrally disposed mounting recess to control the operation of said switch means such that said switch means is disposed adjacent said tracking buoy switch control means to maintain said switch means in said first state.

17. A tracking buoy for deployment in a body of water to monitor and indicate the direction and speed of travel of contaminants in the body of water, said tracking buoy comprises a lower housing and an upper cover, a tracking buoy mounting mechanism comprising a first mounting member including an upper portion affixed to said upper cover and a second mounting member disposed to selectively receive said upper portion of said first mounting member therein and a tracking buoy retainer/release mechanism operatively disposed to selectively retain and release said tracking buoy therefrom, said first mounting member comprises an elongated vertically disposed element having an upper portion and including a first retainer means and said tracking buoy retainer/release mechanism comprises at least one retainer/release device disposed to selectively engage said first retainer means to selectively retain and release said tracking buoy.

18. The tracking buoy of claim 17 wherein said second mounting member comprises an upper mounting body having a centrally disposed mounting recess formed in the lower portion thereof to selectively receive and house said upper portion of said elongated vertically disposed element and a retainer/release mechanism chamber to operatively receive and house a portion of said tracking buoy retainer/release mechanism.

19. The tracking buoy of claim 18 wherein said retainer means comprises an annular groove.

20. The tracking buoy of claim 19 wherein said retainer/release device comprises an actuator member movable between a retention position and release position normally disposed in said retention position to engage said annular groove to retain said upper portion of said elongated vertically disposed element within said centrally disposed mounting recess.

21. The tracking buoy of claim 18 wherein said first mounting member includes a switch means operable in a first and second state to energize said tracking buoy when in said second state, and said tracking buoy retainer/release mechanism includes a tracking buoy switch control means disposed adjacent said centrally disposed mounting recess to control the operation of said switch means such that said switch means is disposed adjacent said tracking buoy switch control means to maintain said switch means in said first state.

* * * * *

UNITED STATES PATENT AND TRADEMARK OFFICE

CERTIFICATE OF CORRECTION

PATENT NO. : 5,954,692

DATED : September 21, 1999

INVENTOR(S) : Keven W. SMITH et al.

It is certified that error appears in the above-indentified patent and that said Letters Patent is hereby corrected as shown below:

On the Title Page, Item 73, "Assignee: Symbiosis" should read --Assignee: Symbiosis Corporation--

Signed and Sealed this

Fourteenth Day of March, 2000

Attest:

Q. TODD DICKINSON

*Attesting Officer*

*Commissioner of Patents and Trademarks*